United States Patent [19]
Omiya et al.

[11] Patent Number: 5,701,523
[45] Date of Patent: Dec. 23, 1997

[54] LENS BARREL

[75] Inventors: Akio Omiya; Takashi Kamoda, both of Saitama-ken, Japan

[73] Assignee: Fuji Photo Optical Co., Ltd., Saitama-ken, Japan

[21] Appl. No.: 780,274

[22] Filed: Jan. 9, 1997

[30] Foreign Application Priority Data

Jan. 10, 1996 [JP] Japan .................. 8-002180

[51] Int. Cl.$^6$ .................. G03B 5/00; G02B 7/04
[52] U.S. Cl. .................. 396/83; 359/700; 359/701; 359/826
[58] Field of Search .................. 396/79, 80, 81, 396/82, 83, 72; 359/699, 700, 701, 825, 826, 698

[56] References Cited

U.S. PATENT DOCUMENTS 5,223,873   6/1993   Tsuboi .................. 396/82
5,448,413   9/1995   Kobayashi et al. .................. 359/698

*Primary Examiner*—W. B. Perkey
*Attorney, Agent, or Firm*—Sixbey, Friedman, Leedom & Ferguson, P.C.; Gerald J. Ferguson, Jr.

[57] ABSTRACT

A lens barrel for a zoom lens having front and rear lens groups has a rotary barrel which is rotatable about the optical axis and moves the front lens group in the direction of the optical axis in response to its rotation. A focusing cam groove formed on the inner surface of the rotary barrel guides the rear lens group to focus the zoom lens in response to rotation of the rotary barrel, and a zooming cam groove formed on the inner surface of the rotary barrel in parallel to the focusing cam groove guides the rear lens group to zoom the zoom lens in response to rotation of the rotary barrel.

6 Claims, 8 Drawing Sheets

LENS BARREL

BACKGROUND OF THE INVENTION

1. Field of the Invention

This invention relates to a lens barrel for a zoom lens for a photographic camera provided with a step zoom mechanism for changing the focal length of the lens in a plurality of focal lengths between a maximum focal length and a minimum focal length, and more particularly to such a lens barrel in which zooming and focusing can be effected by the same drive source.

2. Description of the Related Art

There has been in wide use a photographic camera provided with a zoom lens whose focal length can be continuously changed between a maximum focal length (tele) and a minimum focal length (wide). Such a zoom lens generally comprises front and rear lens groups. When zooming the zoom lens, the front lens group is moved back and forth relative to a fixed barrel in the direction of the optical axis of the zoom lens while the rear lens group is moved backed and forth in the direction of the optical axis maintaining a predetermined optical position relative to the front lens group. When the shutter release button is half depressed after zooming, the zoom lens is focused by a known automatic focusing mechanism.

As disclosed in Japanese Unexamined Patent Publication No. 6(1994)-331877, there has been known a lens drive system in which the front and rear lens groups are linearly moved by a zooming actuator when zooming the zoom lens and only the rear lens group is moved in the direction of the optical axis by a focusing actuator separate from the zooming actuator with the front lens fixed when focusing the zoom lens.

This lens drive system is disadvantageous in that since the separate actuators are used in zooming and focusing, separate drive sources and/or drive systems are necessary, which leads to increase in the overall size of the camera and adds to the manufacturing cost of the camera.

SUMMARY OF THE INVENTION

In view of the foregoing observations and description, the primary object of the present invention is provide In accordance with the present invention, there is provided a lens barrel for a zoom lens having first and second lens units disposed along an optical axis one behind the other in the direction of the optical axis, comprising a rotary barrel which is rotatable about the optical axis and moves the first lens unit in the direction of the optical axis in response to its rotation, a first guide means which is provided on the rotary barrel and guides the second lens unit to focus the zoom lens in response to rotation of the rotary barrel, and a second guide means which is provided on the rotary barrel in parallel to the first guide means and guides the second lens unit to zoom the zoom lens in response to rotation of the rotary barrel.

It is preferred that each of said first and second guide means acts on the second lens unit while the other is not acting on the second lens unit.

The first and second guide means may be formed in parallel on the rotary barrel either spaced from each other in the direction of the optical axis or arranged in a direction normal to the optical axis.

Specifically said rotary barrel is an intermediate barrel which is received in a fixed barrel and moves in and out the fixed barrel in the direction of the optical axis in response to its rotation, said first lens unit is a front lens group held by a movable barrel which is received in the intermediate barrel and moves in and out the intermediate barrel in the direction of the optical axis in response to rotation of the intermediate barrel, and said second lens unit is a rear lens group held by a lens holder behind the front lens group, the lens holder being slidably supported on a guide rod extending in the direction of the optical axis.

Specifically the first and second guide means are respectively a focusing cam groove and a zooming cam groove which are formed in parallel on the inner surface of the intermediate barrel spaced from each other in the direction of the optical axis, and a pair of cam pins which are adapted to be engaged respectively with the focusing cam groove and the zooming cam groove are provided on the lens holder. Otherwise the first and second guide means are respectively a focusing cam groove and a zooming cam groove which are formed in parallel on the inner surface of the intermediate barrel arranged in a direction normal to the optical axis, and a cam pin adapted to be selectively engaged with the focusing cam groove and the zooming cam groove is provided on the lens holder.

In accordance with the present invention, the first guide means which guides the second lens unit to focus the zoom lens in response to rotation of the rotary barrel and. the second guide means which guides the second lens unit to zoom the zoom lens in response to rotation of the rotary barrel are provided on the rotary barrel which moves the first lens unit in the direction of the optical axis in response to its rotation, focusing and zooming can be effected by the same drive source, whereby miniaturization of the photographic camera and reduction in the manufacturing cost of the camera can be realized with a simple arrangement.

Further arranging the first and second means so that each of them acts on the second lens unit while the other is not acting on the second lens unit permits the first and second guide means to be formed on one rotary barrel, thereby simplifying the structure of the lens barrel.

DESCRIPTION OF THE PREFERRED EMBODIMENT

Figure 1:
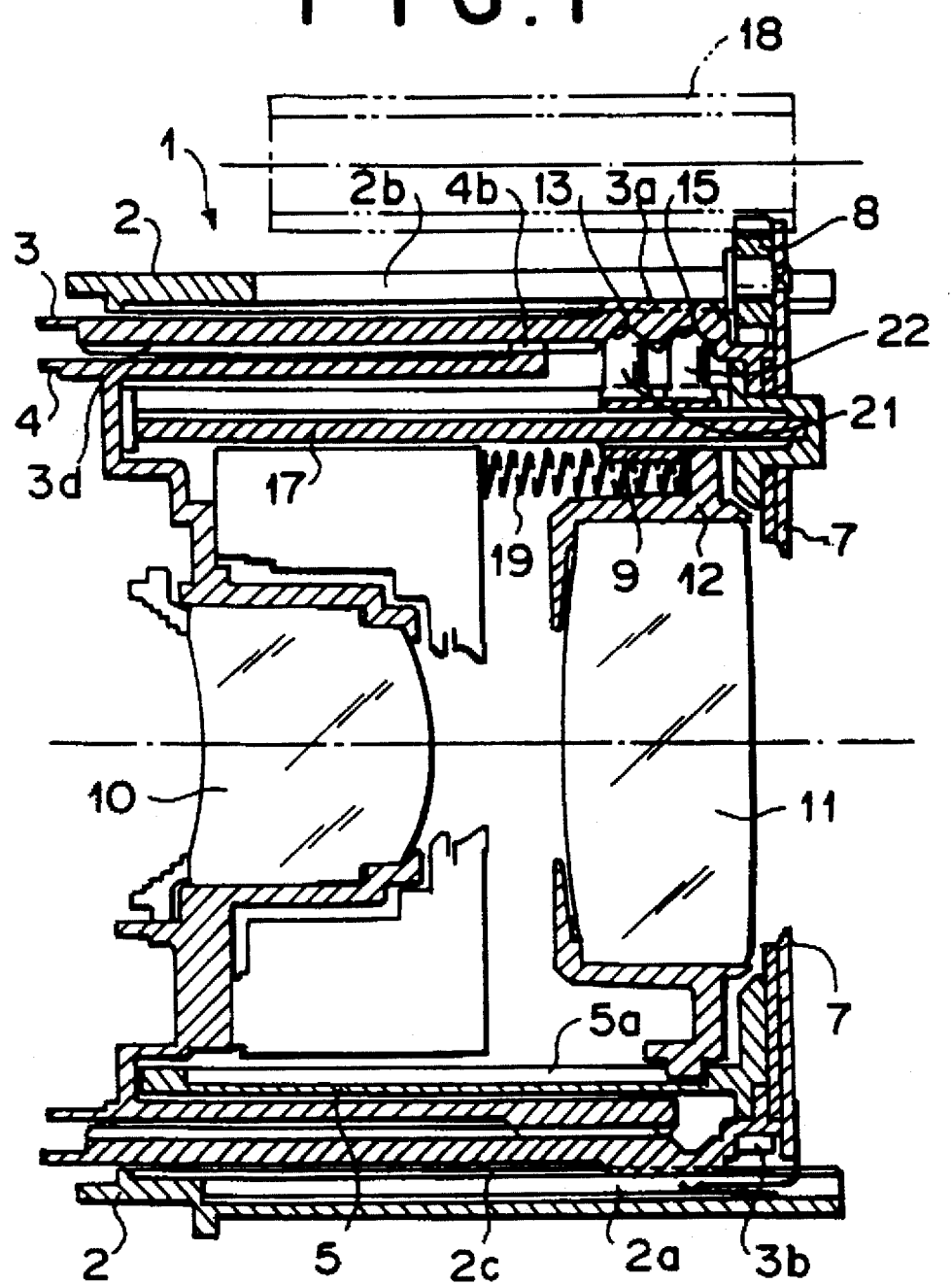
FIG. 1 is a cross-sectional view of a lens barrel in accordance with an embodiment of the present invention in its bottom position.

In FIG. 1, a lens barrel 1 for a zoom lens in accordance with an embodiment of the present invention comprises a fixed barrel 2 fixed in a camera body (not shown), an intermediate barrel (rotary barrel) 3 which is coaxially received for rotation in the fixed barrel 2 and is projected from and retracted in the front end of the fixed barrel 2 in the direction of the optical axis in response to rotation of the intermediate barrel 3 itself, a movable barrel 4 which is coaxially received in the intermediate barrel 3 and is linearly projected and retracted without rotation from the front end of the fixed barrel 2 in the direction of the optical axis in response to rotation of the intermediate barrel 3, and a linearly sliding barrel 5 received in the movable barrel 4. A front lens group 10 held in a lens holder 6 is supported by the front end portion of the movable barrel 4.

A key plate 7 is fixed to the rear end portion of the linearly sliding barrel 5 and in engagement with a groove 2a formed on the inner surface of the fixed barrel 2 to extend in the direction of the optical axis, thereby preventing rotation of the linearly sliding barrel 5 relative to the fixed barrel 2.

A drive gear 18 having long teeth which extend in the direction of the optical axis is supported for rotation outside the fixed barrel 2. The drive gear 18 is driven by an electric motor (not shown). An elongated slit 2b is formed in the fixed barrel 2 to extend in the direction of the optical axis along the drive gear 18, and a slide gear (idler) 8 supported for rotation on the key plate 7 is in mesh with the drive gear 18 through the slit 2b.

A helicoid 3a in mesh with a helicoid 2c formed on the inner peripheral surface of the fixed barrel 2 and gear portion in mesh with the slide gear 8 are formed on the outer peripheral surface of the intermediate barrel 3 on the rear end portion thereof. When a rotational force is transmitted to the intermediate barrel 3 from the drive gear 18 through the slide gear 8, the intermediate barrel 3 moves back or forth in the direction of the optical axis while rotating relative to the fixed barrel 2 and at the same time, the linearly sliding barrel 5 moves back or forth together with the intermediate barrel 3 without rotation. Since the drive gear 18 is elongated in the direction of the optical axis, the slide gear 8 slides along the drive gear 18 in mesh therewith while the intermediate barrel 3 moves along the optical axis.

The movable barrel 4 is provided with a protrusion (not shown) formed on the inner surface thereof to extend in the direction of the optical axis and a helicoid 4b formed on the inner surface thereof. The protrusion is in mesh with a keyway (not shown) formed in the linearly sliding barrel 5 and the helicoid 4b is in mesh with a helicoid 3d formed on the inner surface of the intermediate barrel 3. With this arrangement, the movable barrel 4 is linearly slide along the optical axis under the guidance of the linearly sliding barrel 5 upon rotation of the intermediate barrel 3.

The linearly sliding barrel 5 is further provided with a guide rod 17 and guide groove 5a both extending in the direction of the optical axis diametrically opposed to each other. The rear end portion of the guide rod 17 projects rearward through the key plate 7.

Figure 4:
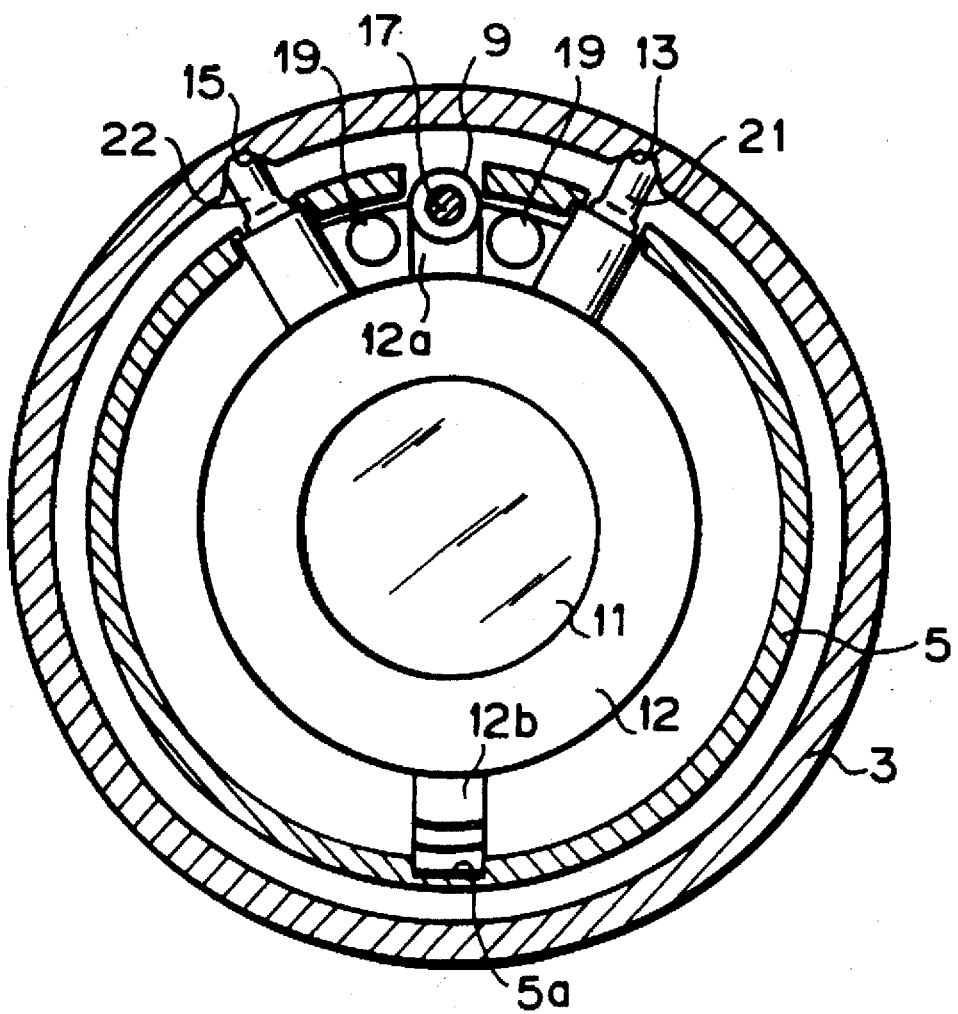
FIG. 4 is a front view showing the state of supporting the rear lens group.

A rear lens group 11 held by a lens holder 12 is disposed behind the front lens group 10. As best shown in FIG. 4, the lens holder 12 is provided with upper and lower support pieces 12a and 12b respectively extending up and down. The upper support piece 12a is provided with a tubular member 9 formed integrally with the upper end portion thereof. The tubular member 9 is slidably fitted on the guide rod 17 of the linearly sliding barrel 5. The lower end portion of the lower support piece 12b is in sliding engagement with the guide groove 5a of the linearly sliding barrel 5.

Figure 5:
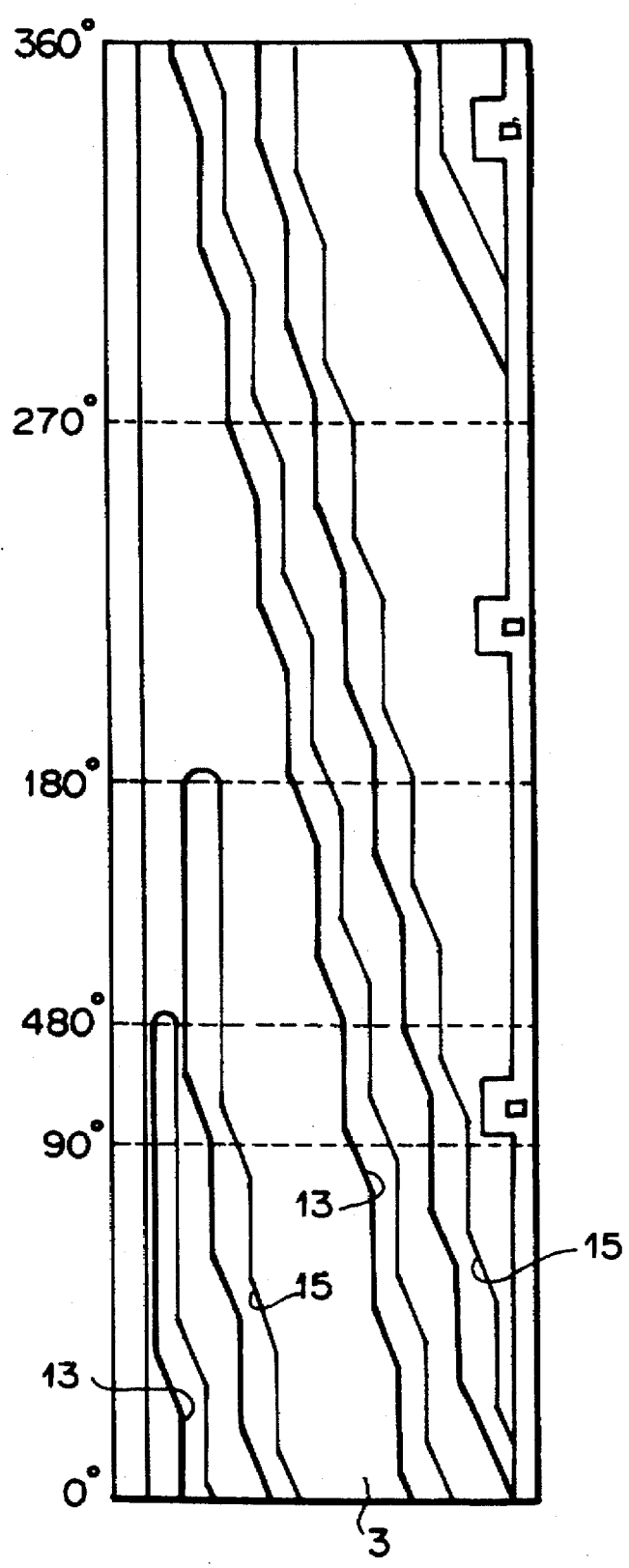
FIG. 5 is a development showing the focusing cam groove and the zooming cam groove formed on the intermediate barrel.

A focusing cam groove 13 and a zooming cam groove 15 each comprising a plurality of parallel portions extending substantially parallel to the rotational direction of the intermediate barrel 3 and inclined portions connecting adjacent parallel portions and inclined at a predetermined angle to the rotational direction of the intermediate barrel 3 are formed in the inner surface of the intermediate barrel 3 in parallel to each other spaced from each other in the direction of the optical axis as shown in FIG. 5. The cam grooves 13 and 15 are shifted by 60° from each other in phase in the direction of rotation of the intermediate barrel 3. A pair of cam pins 21 and 22 respectively adapted to be engaged with the focusing cam groove 13 and the zooming cam groove 15 project radially outward through the linearly sliding barrel 5 from the lens holder 12 of the rear lens group 11 slightly spaced from each in the direction of the optical axis and angularly spaced from each other by 60° around the optical axis. Rotational angle of the intermediate barrel 3 shown in FIG. 5 is based on the position of the focusing cam groove 13 relative to the cam pin 21.

Figure 2:
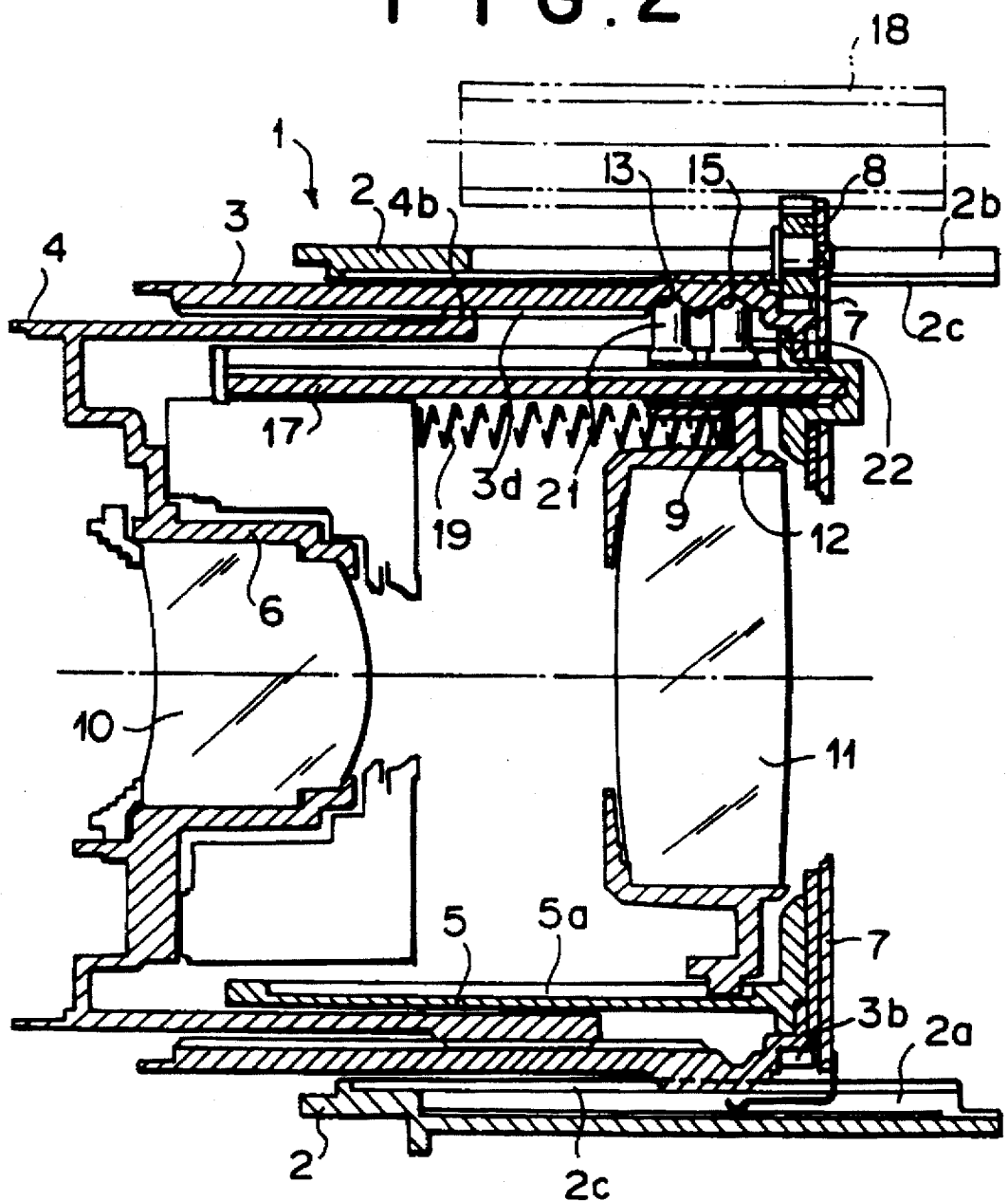
FIG. 2 is a cross-sectional view of the lens barrel in its wide-position.
Figure 3:
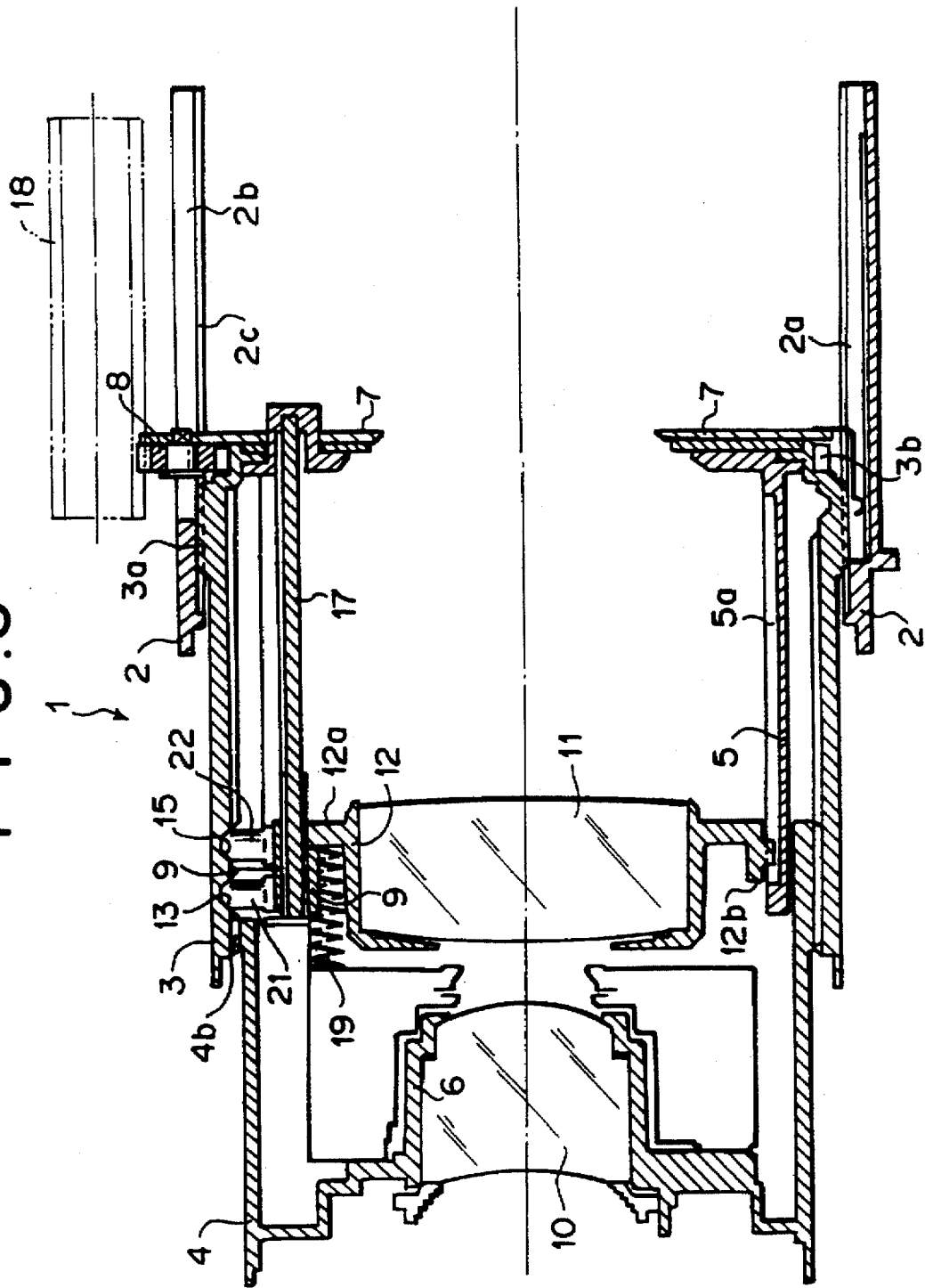
FIG. 3 is a cross-sectional view of the lens barrel in its tele-position.

While the front lens group 10 is moved from the wide-position (at which the focal length of the zoom lens is minimized) shown in FIG. 2 to the tele-position (at which the focal length of the zoom lens is maximized) shown in FIG. 3 in response to rotation of the intermediate barrel 3, the cam grooves 13 and 15 are moved downward from the upper position (as seen in FIG. 5) relative to the cam pins 21 and 22, whereby the rear lens group 11 is moved leftward to the tele-position shown in FIG. 3. Reference numeral 19 denotes a biasing spring.

Figure 6:
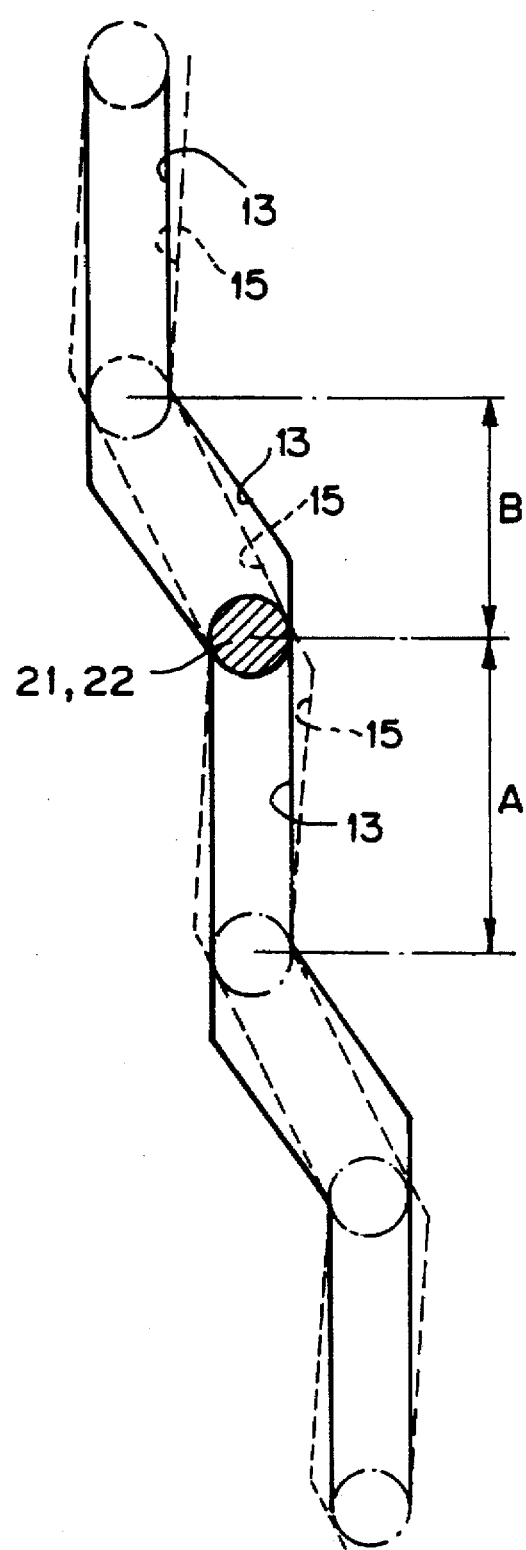
FIG. 6 is an enlarged development schematically showing the shape of the cam grooves with the cam grooves overlapped with each other.

FIG. 6 is an enlarged development view schematically showing the shape of the cam grooves 13 and 15. In FIG. 6, the cam grooves 13 and 15 are shown overlapped with each other with their phases matched with each other for the purpose of simplicity of understanding. The focusing cam groove 13 is shown by the solid line and the zooming cam groove 15 is shown by the broken line.

As can be seen from FIG. 6, the focusing cam groove 13 is narrow in the parallel portions so that when the intermediate barrel 3 rotates and slides in the direction of the optical axis with the cam pin 21 in the parallel portion, the focusing cam groove 13 is brought into engagement with the cam pin 21 to push the pin 21 back or forth and is broad in the inclined portions so that even if the intermediate barrel 3 rotates and slides in the direction of the optical axis with the cam pin 21 in the inclined portion, the focusing cam groove 13 cannot be brought into engagement with the cam pin 21. On the other hand, the zooming cam groove 15 is narrow in the inclined portions so that when the intermediate barrel 3 rotates and slides in the direction of the optical axis with the cam pin 22 in the inclined portion, the zooming cam groove 15 is brought into engagement with the cam pin 22 to push the pin 22 back or forth and is broad in the parallel portions so that even if the intermediate barrel 3 rotates and slides in the direction of the optical axis with the cam pin 22 in the parallel portion, the zooming cam groove 15 cannot be brought into engagement with the cam pin 22. Since the cam grooves 13 and 15 are shifted by 60° from each other in phase and the cam pins 21 and 22 are also angularly spaced from each other by 60°, when one of them is in a parallel portion of the corresponding cam groove, the other is also in a parallel portion of the corresponding cam groove, and when one of them is in an inclined portion of the corresponding cam groove, the other is also in an inclined portion of the corresponding cam groove.

Accordingly, in the rotational angle ranges A (FIG. 6) of the intermediate barrel 3 where the cam pins 21 and 22 are both in the parallel portion, the rear lens group 11 is driven only by engagement of the cam pin 21 with the focusing cam groove 13 and is hardly moved in the direction of the optical axis in response to rotation of the intermediate barrel 3 whereas the front lens group 10 is moved in the direction of the optical axis in response to rotation of the intermediate barrel 3, whereby the zoom lens is focused between a closest distance and infinite.

On the other hand, in the rotational angle ranges B (FIG. 6) of the intermediate barrel 3 where the cam pins 21 and 22 are both in the inclined portion, the rear lens group 11 is driven only by engagement of the cam pin 22 with the zooming cam groove 15 and is moved in the same direction as the front lens group 10 in response to rotation of the intermediate barrel 3, whereby the zoom lens is zoomed.

By providing such parallel portions and inclined portions in a plurality of pairs (e.g., ten), the focal length of the zoom lens can be changed in ten steps while the intermediate barrel 3 rotated through a predetermined angle, e.g., 480° and the zoom lens can be focused at each focal length.

As can be understood from the description above, the lens holder 12 of the rear lens group 11 is selectively driven by the focusing cam groove 13 and the zooming cam groove 15 which are both formed on the intermediate barrel 3 and accordingly, focusing and zooming can be effected by the same drive gear 18, whereby miniaturization of the photographic camera and reduction in the manufacturing cost of the camera can be realized with a simple arrangement.

Figure 7:
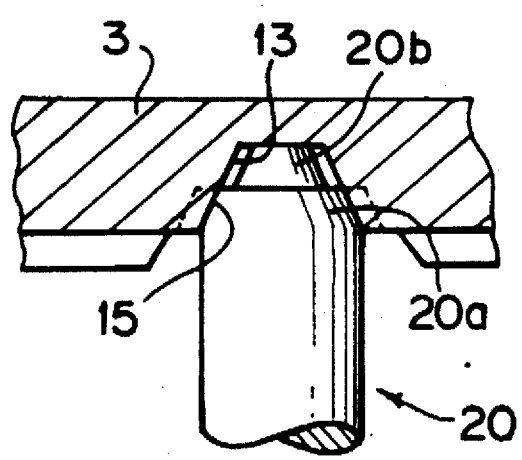
FIG. 7 is an enlarged cross-sectional view showing an important part of a lens barrel in accordance with another embodiment of the present invention.

Though, in the embodiment described above, the cam grooves 13 and 15 are formed in parallel spaced from each other in the direction of the optical axis, it is possible to form the cam grooves 13 and 15 arranged in a radial direction or in a direction normal to the optical axis as shown in FIG. 7. That is, as shown in FIG. 7, the zooming cam groove 15 is formed on the inner surface of the intermediate barrel 3 at the surface thereof and the focusing cam groove 13 is formed in the bottom of the zooming cam groove 15. A cam pin 20 has a small diameter portion 20b adapted to be engaged with the focusing cam groove 13 and a large diameter portion 20a adapted to be engaged with the zooming cam groove 15.

Figure 8:
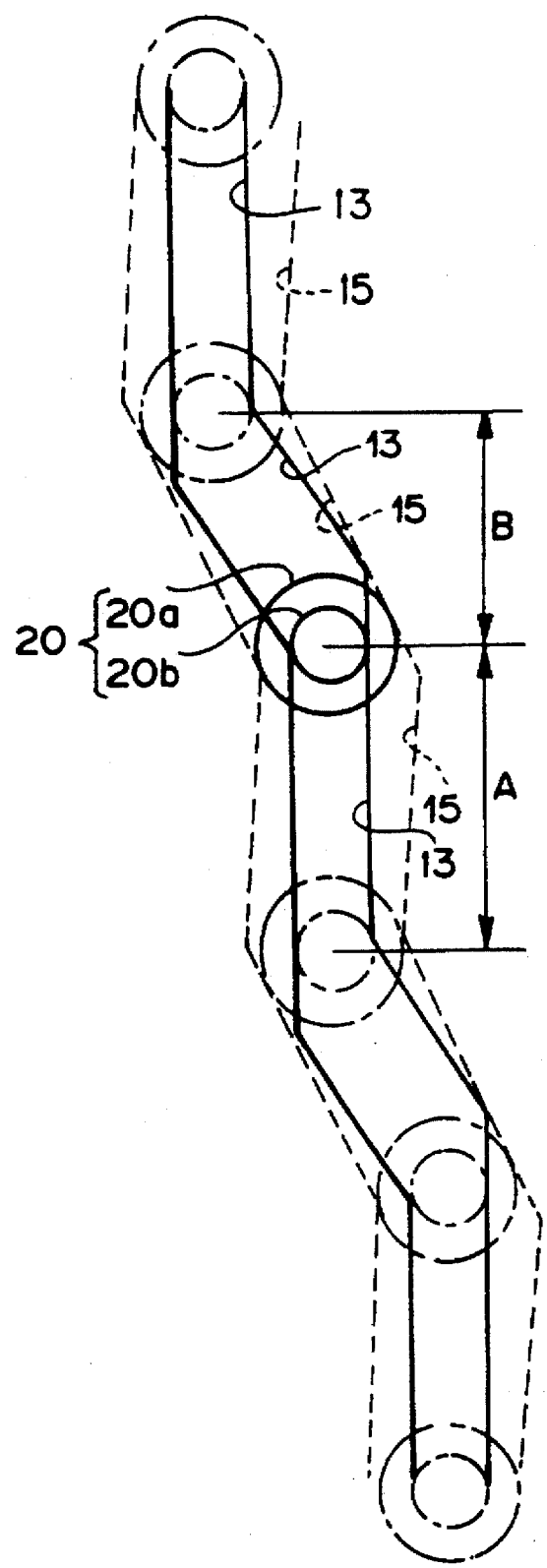
FIG. 8 is an enlarged development schematically showing the shape of the focusing cam groove and the zooming cam groove in the lens barrel.

FIG. 8 shows in a development the focusing cam groove 13 (the solid line) and the zooming cam groove 15 (the broken line). As in FIG. 6, in the rotational angle ranges A, the small diameter portion 20b of the cam pin 20 is engaged with the focusing cam groove 13 to focus the zoom lens and in the rotational angle ranges B, the large diameter portion 20a of the cam pin 20 is engaged with the zooming cam groove 15 to zoom the zoom lens.

What is claimed is:

1. A lens barrel for a zoom lens having first and second lens units disposed along an optical axis one behind the other in the direction of the optical axis, comprising a rotary barrel which is rotatable about the optical axis and moves the first lens unit in the direction of the optical axis in response to its rotation, a first guide means which is provided on the rotary barrel and guides the second lens unit to focus the zoom lens in response to rotation of the rotary barrel, and a second guide means which is provided on the rotary barrel in parallel to the first guide means and guides the second lens unit to zoom the zoom lens in response to rotation of the rotary barrel.

2. A lens barrel as defined in claim 1 in which each of said first and second guide means acts on the second lens unit while the other is not acting on the second lens unit.

3. A lens barrel as defined in claim 2 in which said first and second guide means are formed in parallel on the rotary barrel spaced from each other in the direction of the optical axis.

4. A lens barrel as defined in claim 3 in which said rotary barrel is an intermediate barrel which is received in a fixed barrel and moves in and out the fixed barrel in the direction of the optical axis in response to its rotation, said first lens unit is a front lens group held by a movable barrel which is received in the intermediate barrel and moves in and out the intermediate barrel in the direction of the optical axis in response to rotation of the intermediate barrel, said second lens unit is a rear lens group held by a lens holder behind the front lens group, the lens holder being slidably supported on a guide rod extending in the direction of the optical axis, said first and second guide means are respectively a focusing cam groove and a zooming cam groove which are formed in parallel on the inner surface of the intermediate barrel spaced from each other in the direction of the optical axis, and a pair of cam pins which are adapted to be engaged respectively with the focusing cam groove and the zooming cam groove are provided on the lens holder.

5. A lens barrel as defined in claim 2 in which said first and second guide means are formed on the rotary barrel arranged in a direction normal to the optical axis.

6. A lens barrel as defined in claim 5 in which said rotary barrel is an intermediate barrel which is received in a fixed barrel and moves in and out the fixed barrel in the direction of the optical axis in response to its rotation, said first lens unit is a front lens group held by a movable barrel which is received in the intermediate barrel and moves in and out the intermediate barrel in the direction of the optical axis in response to rotation of the intermediate barrel, said second lens unit is a rear lens group held by a lens holder behind the front lens group, the lens holder being slidably supported on a guide rod extending in the direction of the optical axis, said first and second guide means are respectively a focusing cam groove and a zooming cam groove which are formed in parallel on the inner surface of the intermediate barrel arranged in a direction normal to the optical axis, and a cam pin adapted to be selectively engaged with the focusing cam groove and the zooming cam groove is provided on the lens holder.

* * * * *